United States Patent
Wu et al.

(10) Patent No.: US 7,860,201 B2
(45) Date of Patent: Dec. 28, 2010

(54) INTERFERENCE CANCELING MATCHED FILTER (ICMF) AND RELATED METHODS

(75) Inventors: Huan Wu, Kanata (CA); Sean Simmons, Waterloo (CA); Zoltan Kemenczy, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/579,923

(22) Filed: Oct. 15, 2009

(65) Prior Publication Data

US 2010/0091831 A1    Apr. 15, 2010

Related U.S. Application Data

(63) Continuation of application No. 11/464,542, filed on Aug. 15, 2006, now Pat. No. 7,623,605.

(60) Provisional application No. 60/708,298, filed on Aug. 15, 2005.

(51) Int. Cl.
  *H04L 27/06* (2006.01)
  *H04B 1/10* (2006.01)
(52) U.S. Cl. .................... 375/350; 375/340
(58) Field of Classification Search ................ 375/267, 375/347, 285, 346, 350, 340, 341, 229–231; 708/300, 322, 323
See application file for complete search history.

(56) References Cited

U.S. PATENT DOCUMENTS

| | | | |
|---|---|---|---|
| 5,349,607 A | 9/1994 | Moreno | 375/94 |
| 5,493,307 A | 2/1996 | Tsujimoto | 342/380 |
| 6,154,443 A | 11/2000 | Huang et al. | 370/210 |
| 6,314,147 B1 | 11/2001 | Liang et al. | 375/346 |
| 6,724,809 B2 | 4/2004 | Reznik | 375/148 |
| 6,775,260 B1 | 8/2004 | Dabak et al. | 370/342 |
| 7,295,636 B2 | 11/2007 | Onggosanusi et al. | 375/346 |
| 7,668,264 B2 * | 2/2010 | Park et al. | 375/346 |
| 2003/0108117 A1 | 6/2003 | Ketchum et al. | 375/295 |
| 2004/0062328 A1 | 4/2004 | Kuzminskiy et al. | 375/347 |
| 2004/0141565 A1 | 7/2004 | Kwak et al. | 375/267 |
| 2004/0192215 A1 | 9/2004 | Onggosanusi et al. | 455/67.13 |
| 2005/0201493 A1 | 9/2005 | Onggosanusi et al. | 375/340 |
| 2006/0109938 A1 | 5/2006 | Challa et al. | 375/347 |
| 2007/0129042 A1 | 6/2007 | Kristensson et al. | 455/296 |
| 2008/0187076 A1 | 8/2008 | Wu et al. | 375/323 |

OTHER PUBLICATIONS

Samanta, *Joint Co-channel Interference Cancellation and Channel Shortening with Space-Time Processing*, Wireless Systems Innovations Laboratory, University of Texas at Austin, Spring 2003.

(Continued)

*Primary Examiner*—Tesfaldet Bocure
(74) *Attorney, Agent, or Firm*—Allen, Dyer, Doppelt, Milbrath & Gilchrist, P.A.

(57) ABSTRACT

An interference cancelling matched filter (ICMF) may include an antenna for receiving a signal burst including a training sequence therein, and an adaptive space-time filter connected to the antenna and having settable filter coefficients. The ICMF may further include a channel impulse response estimator for estimating a channel impulse response based upon the training sequence, and a signal blocker operatively connected between the channel impulse response estimator and the adaptive space-time filter so that the filter coefficients thereof are set based upon the training sequence.

24 Claims, 8 Drawing Sheets

OTHER PUBLICATIONS

Pipon et al., *Multichannel Receivers Performance Comparison in the Presence of ISI and CCI*, Thomson-CSF Communications, IEEE Digital Signal Processing Proceedings, 1997. DSP 97, 1997 13th International Conference on Publication Date: Jul. 2-4, 1997, vol. 1, pp. 371-374.

Liang et al., *A Two-Stage Hybrid Approach for CCI/ISI Reduction with Space-Time Processing*, IEEE Communications Letters, vol. 1, No. 6, Nov. 1997.

Trigui et al., *Optimal and Suboptimal Approaches for Training Sequences based Spatio-Temporal Channel Identification in Colored Noise*, IEEE, 1998, pp. 1038-1042.

Spagnolini, *Adaptive Rank-One Receiver for GSM/DCS Systems*, IEEE Transactions on Vehicular Technology, vol. 51, No. 5, Sep. 2002.

Slock et al, *An Interference Cancelling Multi-Channel Matched Filter*, Global Telecommunications Conference, GLOBECOM '96, Communications: The Key to Global Prosperity, 1996, IEEE, pp. 214-218.

\* cited by examiner

INTERFERENCE CANCELING MATCHED FILTER (ICMF) AND RELATED METHODS

CROSS-REFERENCE TO RELATED APPLICATIONS

This application is a continuation of Ser. No. 11/464,542 filed Aug. 15, 2006, now U.S. Pat. No. 7,623,605 issued Nov. 24, 2009 which claims the benefit of U.S. Provisional Application No. 60/708,298, filed Aug. 15, 2005, both of which is are hereby incorporated herein in its entirety their entireties by reference.

FIELD OF THE INVENTION

The present invention relates to wireless communications systems, such as cellular communications systems, and, more particularly, to filtering received wireless signals to reduce unwanted interference.

BACKGROUND

Interference canceling matched filters (ICMF) have been investigated to meet requirements for a Downlink Advanced Receiver Performance (DARP) that is standardized by the third generation mobile communications system and the Third Generation Partnership Project (3GPP). Some of these proposals are set forth in the following articles and documents:
1. Slock et al., An Interference Cancelling Multichannel Matched Filter, Globecom November 1996;
2. Trigui et al., Cochannel Interference Cancellation Within The Current GSM Standard, IEEE IC on Universal Personal Communications, 1996;
3. Griffiths et al., An Alternative Approach to Linearly Constrained Adaptive Beamforming, IEEE Trans. AP-30, No. 1, 1982;
4, Pukkila et al., Cochannel Interference Suppression for Constant Modulus Signal, IEEE ICC-2004; and
5. Liang et al., A Two-Stage Hybrid Approach for CCI/ISI Reduction with Space-Time Processing, IEEE Communication Letter Vol. 1, No. 6, November 1997.

Current Global System for Mobile communications (GSM) cellular systems have to address the co-channel interference (CCI) on the mobile station (MS) side, as well as address the DARP requirements. Some single channel structures and pre-filters have been used to aid in canceling the interference and provide some channel impulse response (CIR) estimation. Moreover, some systems have used maximization of the signal-to-interference to design jointly a single channel space-time filter and the CIR estimation for a single channel. Other systems have used a constrained minimization of the mean-square error to design a single channel space filter. Other systems have used a single channel space filter that is designed by a rank-one approximation of the ML channel estimation. The target applications for these systems have been a base station where a physical antenna array including a plurality of antennas is available.

An ICMF performs "blind" interference cancellation (BIC), as it does not need the knowledge of the channel response of the interferers. Yet, the channel response of the wanted or desired signal still has to be known or be estimated. Further details of the ICMF may be found in an article by Slock et al. entitled "An Interference Canceling Multichannel Matched Filter," IEEE, pgs. 214-218, November 1996. Moreover, the potential application of ICMFs to Global System for Mobile Communication (GSM) Single Antenna Interference Cancellation (SAIC) is discussed in and article to Slock et al. entitled "Cochannel Interference Cancellation Within the Current GSM Standard," IEEE International Conference on Universal Personal Communications, 1996.

Despite the advancements in ICMF systems, channel estimation may still be problematic, and thus the DARP requirements difficult to achieve. Accordingly, further advancements in the use of ICMFs in cellular telephone applications, particularly for DARP-compliant devices, are desirable.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

In accordance with one embodiment, Co-Channel Interference (CCI) on a mobile station (MS) side in a current Global System for Mobile (GSM) communications system is addressed, as well as the compliant requirement of a Downlink Advanced Receiver Performance (DARP) standard by the Third Generation Partnership Project (3GPP).

Generally speaking, an interference cancelling matched filter (ICMF) system is described herein which may include an antenna array for receiving a signal burst including a training sequence therein, and an adaptive space-time filter connected to the virtual antenna array and having settable filter coefficients. The ICMF system may further include a channel impulse response estimator for estimating a channel impulse response based upon the training sequence, and a signal blocker operatively connected between the channel impulse response estimator and the adaptive space-time filter so that the filter coefficients thereof are set based upon the training sequence and not the whole signal burst.

The signal blacker may subtract a re-modulated training sequence from corresponding received signals. More particularly, the signal blacker may include a summer and a convolver connected thereto, and the convolver may re-modulate the training sequence by convolving the training sequence with the estimated channel response. Furthermore, the antenna array may be a virtual antenna array, for example. In addition, the adaptive space-time filter may include a Wiener filter for generating an interference estimation, and the adaptive space-time filter may further include a summer for subtracting the interference estimation from the received signal burst.

By way of example, the channel impulse response estimator may estimate the channel impulse response based upon a cross-correlation of the training sequence and the received signal burst. The channel impulse response estimator may also estimate the channel impulse response using a least-square channel estimation based upon the training sequence. The estimation of the channel impulse response may also be based upon a maximization of a signal-to-noise ratio of the received signals corresponding to the training sequence. In addition, the channel impulse response estimator may estimate the channel response based upon constant modulus interference removal, and optionally based upon an Eigenvector decomposition estimation as well.

An interference canceling matched filtering method may include receiving a signal burst including a training sequence therein using an antenna array, and estimating a channel impulse response based upon the training sequence. The method may further include filtering the received signal burst using an adaptive space-time filter having settable filter coefficients, and performing signal blocking on the received signal burst so that the filter coefficients of the adaptive space-time filter are set based upon the training sequence and not the whole signal burst.

Also, a wireless communications device may include a wireless transmitter and a wireless receiver. In particular, the wireless receiver may include an interference cancelling matched filter such as the one described briefly above.

Figure 1A:
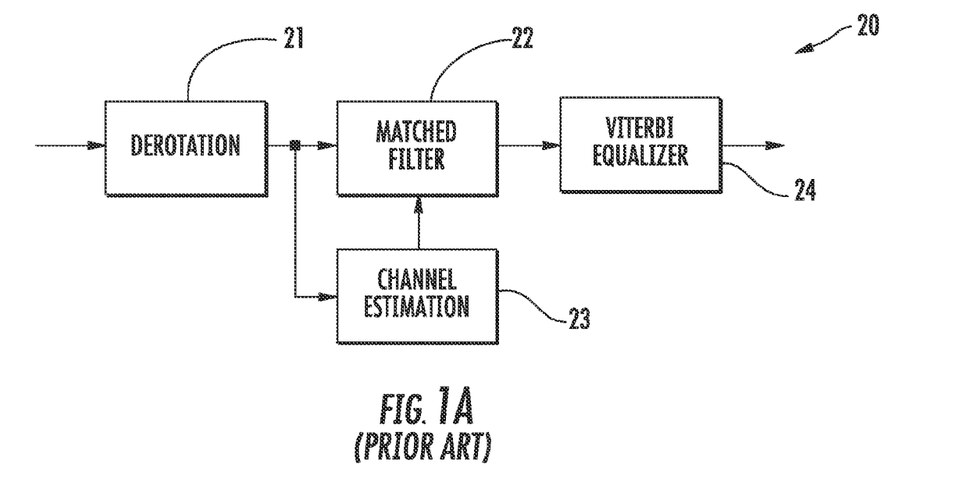
FIGS. 1A and 1B are schematic block diagrams of a GSM receiver in accordance with the prior art and a DARP-capable ICMF GSM receiver in accordance with one exemplary embodiment, respectively.

Referring initially to FIG. 1A, by way of reference a conventional GSM receiver 20 includes a derotator 21 into which a received GSM signal is input, and a matched filter 22 connected to the output of the derotator. A channel estimator 23 is also connected to the output of the derotator 21 and to the matched filter 22, and a Viterbi equalizer 24 is connected to the outputs of the matched filter and channel estimator.

Figure 1B:
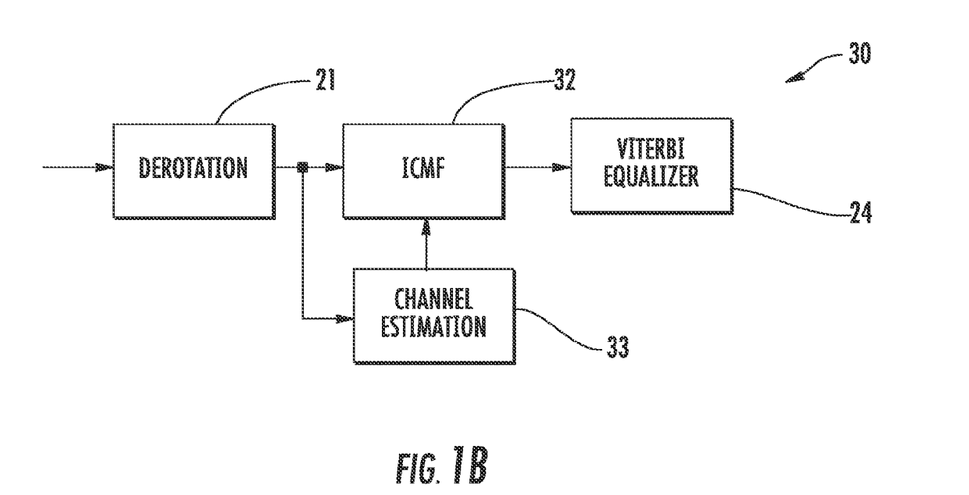

By way of comparison, a DARP-capable GSM receiver 30 in accordance with one exemplary embodiment is now initially described with reference to FIG. 1P. The DARP-capable GSM receiver 30 illustratively includes an ICMF 32 connected to the output of the derotator 21, and a channel estimator 33 also connected to the output of the derotation stage and to the ICMF. As schematically illustrated in the drawing, the ICMF 32 and channel estimator 33 may advantageously be inserted into the typical GSM receiver configuration in place of the matched filter 22 and corresponding channel estimator 23 without the need to change the standard derotator 21 and Viterbi equalizer 24, as will be appreciated more fully from the discussion below.

Generally speaking, the present ICMF SAIC approach uses the input data as though there were several "virtual" input antennas. It then uses traditional beam-forming techniques to combine the virtual antennas to improve the signal-to-interference-noise ratio (SINR) for the desired signal. Considered alternately, the SAIC ICMF 32 functions as an adaptive space-time filter.

More particularly, the premise behind the SAIC ICMF 32 is that by exploiting oversampling and the BPSK nature of the GMSK signal, a virtual antenna array can be established. Once the virtual antenna array and the knowledge of the channel response of the wanted signal is established, conventional beamforming technology can be used for the interference cancellation. The underlying assumption for the beamforming is that the interference is spatially or/and temporally correlated and it arrives at different paths from the wanted or desired signal. This assumption is statistically true in the GSM fading environment. However, it should be noted that in some embodiments an array of real antennas (i.e., without oversampling) may be used. The beamforming algorithm used in the ICMF 32 may be based on the Generalized Sidelobe Canceller (GSC) as disclosed in the Griffiths et al. article entitled "An Alternative Approach to Linearly Constrained Adaptive Beamforming," IEEE Trans. Antennas Propag., vol. AP-30, pp 27-34, January 1982.

Figure 2:
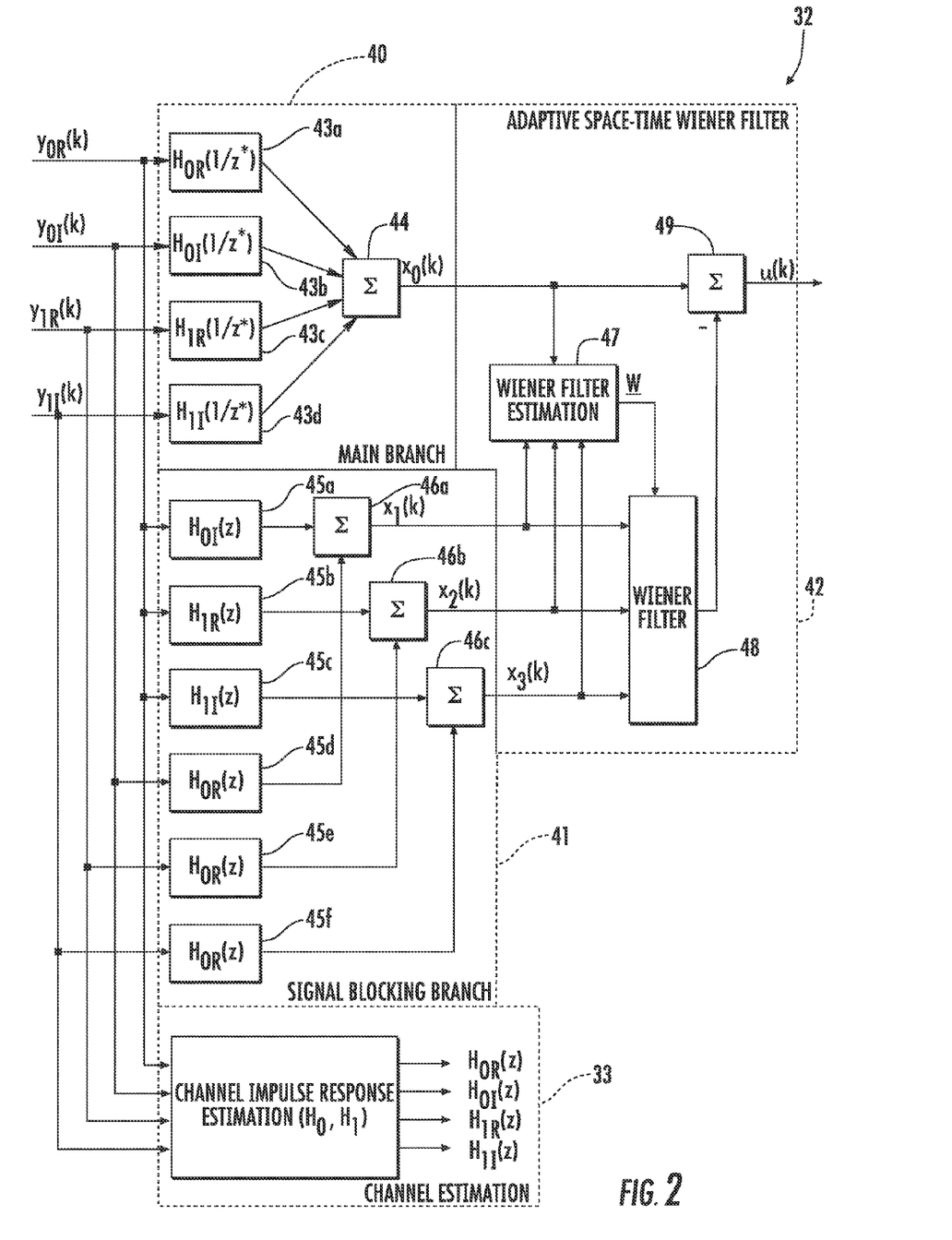
FIG. 2 is a schematic block diagram of the ICMF and channel estimator of FIG. 18 illustrated in greater detail.

Referring now to FIG. 2, the SAIC ICMF 32 and channel estimation stage 33 are now described in further detail. The ICMF 32 includes a main branch 40 of the virtual antenna array, a signal blocking branch 41 of the array, and a 2D (i.e., virtual spatial and temporal) adaptive Wiener filter 42.

The virtual antenna array results from the oversampling of the received signal and the separation of the real (I) and imaginary (Q) parts of the signal. In the illustrated embodiment, the signal $y_{0R}(k)$ is the "on sample" real signal component, $y_{0I}(k)$ is the on sample imaginary signal component, $y_{1R}(k)$ is the "off" or "over" sample real signal component, and $y_{1I}(k)$ is the off sample imaginary signal component. As will be appreciated by those skilled in the art, the oversampled samples $y_{1R}(k)$, $y_{1I}(k)$ may be treated as independent channels of the antennae. The rationale behind the separation of the I/Q parts is due to the nature of the GMSK modulation. After derotation, the GMSK signal may be treated as a BPSK signal, and hence the I and Q channels are considered independent to some extent (although the intersymbol interference (ISI) compromises this assumption somewhat).

In a GSC beamformer, the main branch is a conventional receiver filter. In the ICMF 32, the main branch 40 is a multi-channel matched filter including respective filters 43a-43d for each of the signal components $y_{0R}(k)$, $y_{0I}(k)$, $y_{1R}(k)$, and $y_{1I}(k)$, and a summer 44 for summing the outputs of the filter blocks. The output $x_O(k)$ of the main branch 40 (i.e., the summer 44 output) contains both the wanted or desired signal and the undesired interference. The wanted signal is enhanced in the main branch 40 because of the summation of the phase-aligned signal of the matched filter output, as will be appreciated by those skilled in the art.

The signal blocking branch 41 implements a transformation that generates a group of sub-channels $x_1(k)$, $x_2(k)$, and $x_3(k)$ including only the interference. More particularly, the signal blocking branch 41 implements a blocking transformation using a plurality of signal blocking filters 45a-45f and summers 46a-46d and corresponding to a transformation matrix T(z) defined as follows:

$$T(z) = \begin{bmatrix} H_{0I}(z) & -H_{0R}(z) & 0 & 0 \\ H_{1R}(z) & 0 & -H_{0R}(z) & 0 \\ H_{1I}(z) & 0 & 0 & -H_{0R}(z) \end{bmatrix}. \quad (1)$$

Generally speaking, the blocking algorithm finds the null space in the observation space of the array. Assuming there are N virtual antennae, the dimension of the null space would be N−1 since there is only one wanted signal (i.e., the dimension of the signal space is one). It should be noted that other approaches may be used to form different transformation matrices, if desired, as will be appreciated by those skilled in the art.

Turning now to the adaptive space-time Wiener filter 42, space-time two-dimensional processing is used because, relative to the sampling rate, the interference is broadband. Using time domain filtering will compensate for the delays caused by the signal blocking filters 45a-45f and phase-align the interference with the output of the main branch 40. The adaptive space-time Wiener filter 42 illustratively includes a Wiener filter estimator 47 receiving as inputs the output $x_O(k)$ of the main branch 40 and the outputs $x_1(k)$, $x_2(k)$, and $x_3(k)$ of the signal blocking branch 41. A Wiener filter 48 receives the outputs $x_1(k)$, $x_2(k)$, and $x_3(k)$ of the signal blocking branch 41 as well as the output W of the Wiener filter estimator 47. Furthermore, a summer subtracts the output of the Wiener filter 48 from the output $x_O(k)$ of the main branch 40 to provide the final filtered signal u(k).

Figure 3:
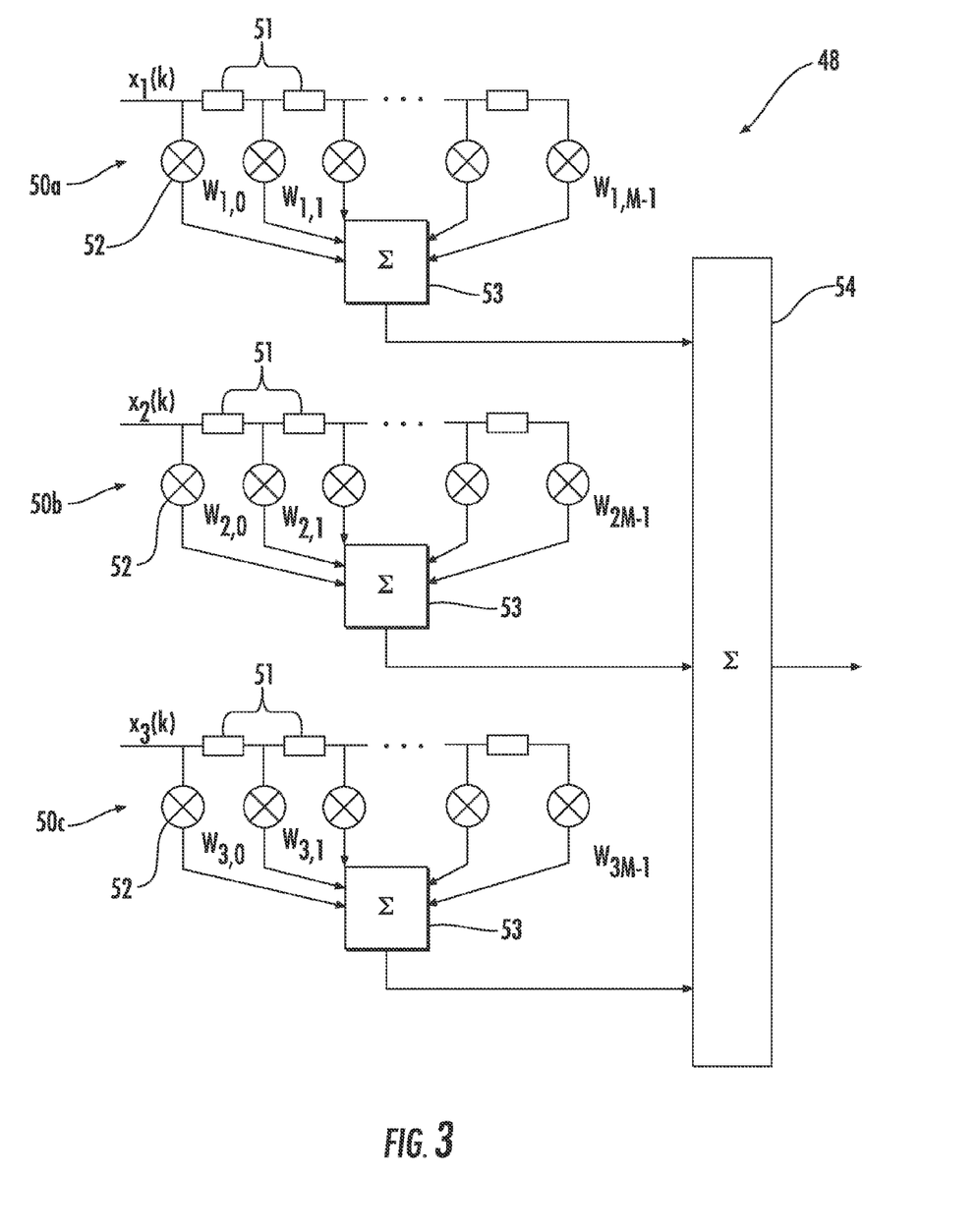
FIG. 3 is a schematic block diagram of the Wiener filter of FIG. 2 illustrated in greater detail.

The structure of the two-dimensional Wiener filter 48 having an oversampling ratio of two is now described with reference to FIG. 3. The filter 48 includes a respective branch 50a-50c for each of the sub-channel outputs $x_1(k)$, $x_2(k)$, and $x_3(k)$ of the signal blocking branch 41. Each branch 50a-50c includes a plurality of parallel gain multiplier stages 52 each having an input and an output, and all of the outputs are connected to a summer 53. Moreover, a respective delay stage 51 is connected between the inputs of each adjacent pair of gain multiplier stages 52 such that the delay stages are series-connected to one another as shown. The outputs of the branch summers 53 are in turn summed by a summer 54, which provides the output of the Wiener filter 48.

In general, the solution of the 2D Wiener filter is W with the length of (N−1)×M:

$$W = (B^H B)^{-1} B^H a, \quad (2)$$

where $$a = [x_0(M-1), x_0(M), \ldots x_0(K)]^T, \quad (3)$$

and $x_0(k)$ is the output of the main branch 40. K is the number of symbols in a burst, and M is the number of taps of the filter in the time domain, where $$B = \begin{bmatrix} x_1(M-1) & \ldots & x_1(0) & \ldots & \ldots & x_{N-1}(M-1) & \ldots & x_{N-1}(0) \\ x_1(M) & \ldots & x_1(1) & \ldots & \ldots & x_{N-1}(M) & \ldots & x_{N-1}(1) \\ \vdots & \vdots & \vdots & \vdots & \vdots & \vdots & \vdots & \vdots \\ x_1(K) & \ldots & x_1(K-M+1) & \ldots & \ldots & x_{N-1}(K) & \ldots & x_{N-1}(K-M+1) \end{bmatrix}. \quad (4)$$

Furthermore, $x_n(k)$'s are the output of the signal blocking branch 41.

To provide the necessary accuracy to achieve the DARP requirements, Applicants theorize without wishing to be bound thereto that certain channel estimation enhancements may be used. Two such enhancements may include: (1) CIR improvement with the constant modulus property of the interference taken into consideration; and (2) using subspace-finding-based channel estimation methods such as those reported in the Liang et al. article entitled "A Two-Stage Hybrid Approach for CCI/ISI Reduction with Space-Time Processing," IEEE Communications Letters, pp. 163-165, November 1997, and the Kiang et al. article entitled "Structured Semi-Blind Interference Rejection in Dispersive Multichannel Systems," IEEE Transactions on Signal Processing, Volume 50, Issue 8, August 2002, both of which are hereby incorporated herein in their entireties by reference. Generally speaking, the approaches in (2) take into account the interference in the optimization target, and these methods use an Eigenvalue or singular decomposition computation.

Figure 4:
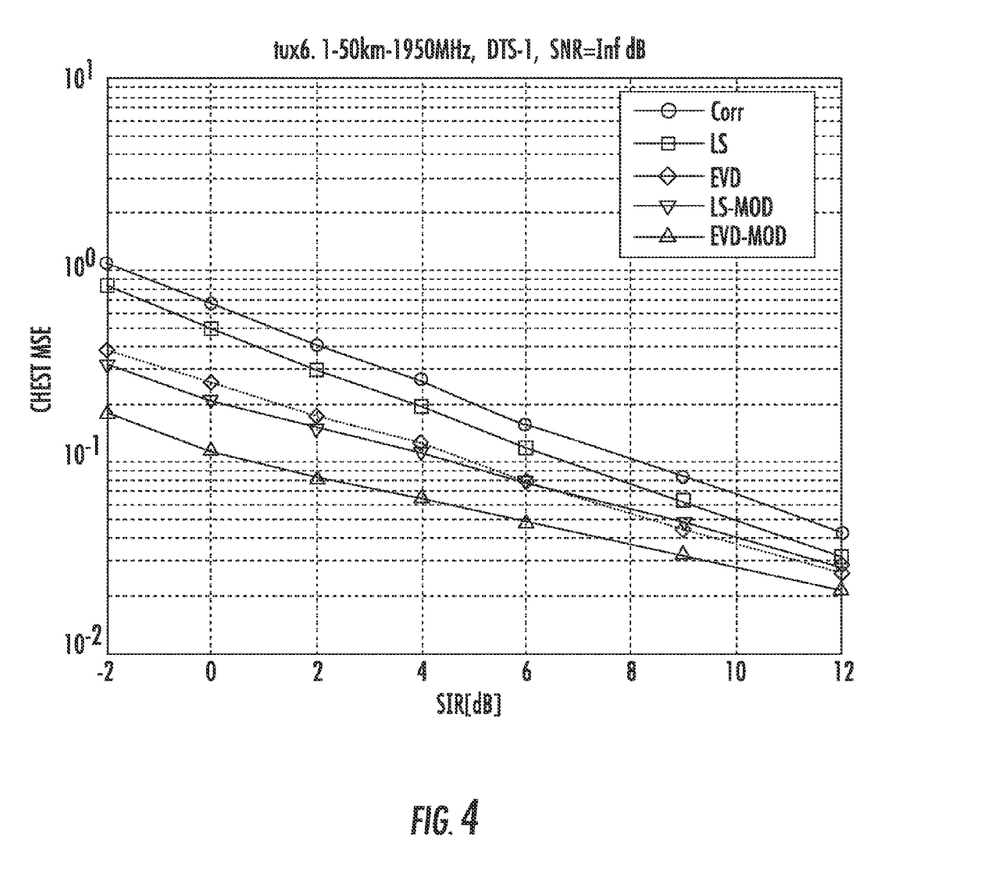
FIG. 4 is a graph of simulated mean-squared-error (MSE) vs. signal-to-interference ratio for the channel estimator for various channel estimation techniques.

More particularly, the channel estimation stage 33 may estimate the channel impulse response (CIR) of the wanted signal based upon the known training sequence included in the received signal burst. One approach for doing so is to perform a cross-correlation of the training sequence and the received samples. Another approach is to use a least-square channel estimation based upon the training sequence. Still another approach is based upon a maximization of the signal-to-noise ratio (SNR) of the received samples of the training sequence. The channel estimation is the Eigenvector of the largest Eigenvalue in the signal subspace (EVD). Yet another approach is based upon constant modulus interference removal, where an initial channel estimate is taken from the least-square estimator. One further approach is based upon constant modulus signal removal and initial EVD estimation. A mean-squared error for each of the five above-described channel estimation approaches has been simulated for the receiver 30, and the results are shown in the graph of FIG. 4.

Figure 5:
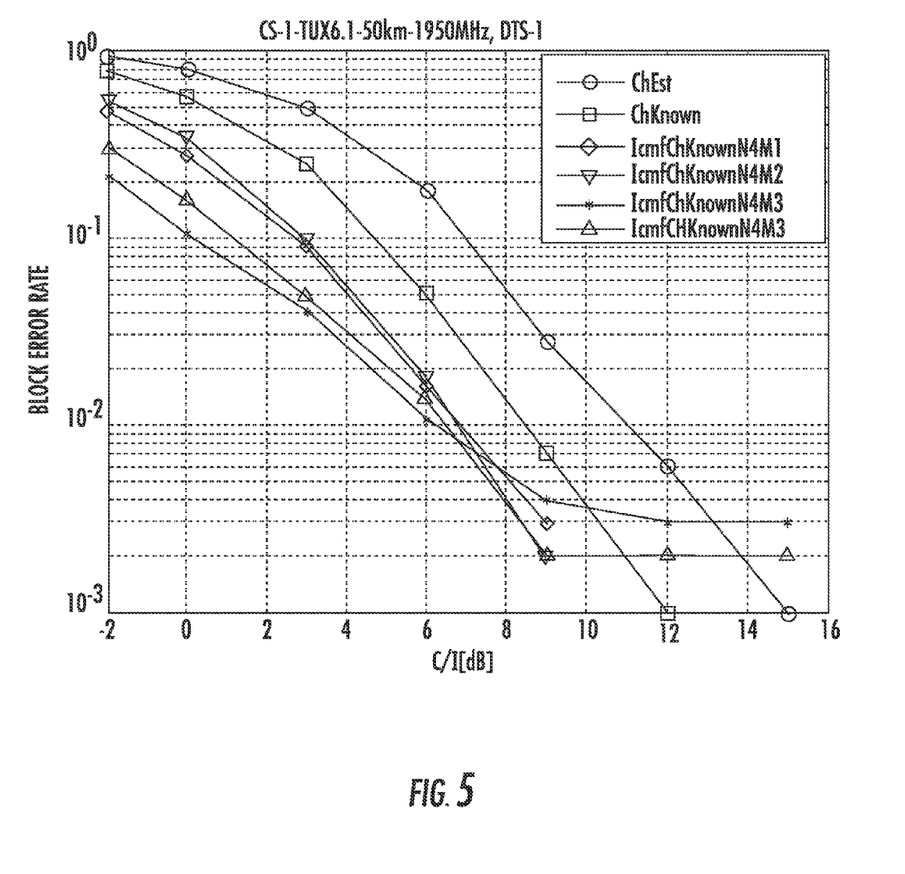
FIG. 5 is a graph of simulated performance results for the DARP-capable ICMF GSM receiver of FIG. 2.

Applicants have also simulated overall performance of the receiver 30 and have noted improvements with respect to the prior art receiver 20 for known desired signals CIR using the above-described ICMF SAIC. The results of these simulations are shown in the graph of FIG. 5. The block error rate of the DARP-capable GSM receiver 30 was collected and compared with that of the conventional receiver 20. The logical channel used in the simulation is CS-1. The fading channel is TU50 km/h-1950 MHz and the interference configuration is DTS-1 as proposed in GP-042829, Change Request—45.005 CR 092 Rev 2., 3GPP TSG-GERAN Meeting #22, GP-042829, November 2004. An oversampling ratio of 1 (N=2) and 2 (N=4) and the temporal filter length of M=1, 2, and 3 were used in the simulations as shown. Generally speaking, the DARP-capable GSM receiver 30 demonstrated up to 5 dB improvement under the simulation (CS-1, TU50 km/h-1950 MHz, DTS-1), provided that the channel impulse response of the wanted signal was known.

Some advantages of the SAIC ICMF approach outlined above include its relative simplicity (i.e., relatively low computational complexity) and robustness (i.e., it makes very few assumptions about the source of the interference). In addition, this approach allows the existing GSM Viterbi equalizer structure to be used, as the solution is integrated as a preprocessing step on the input data, as discussed further above.

Figure 6:
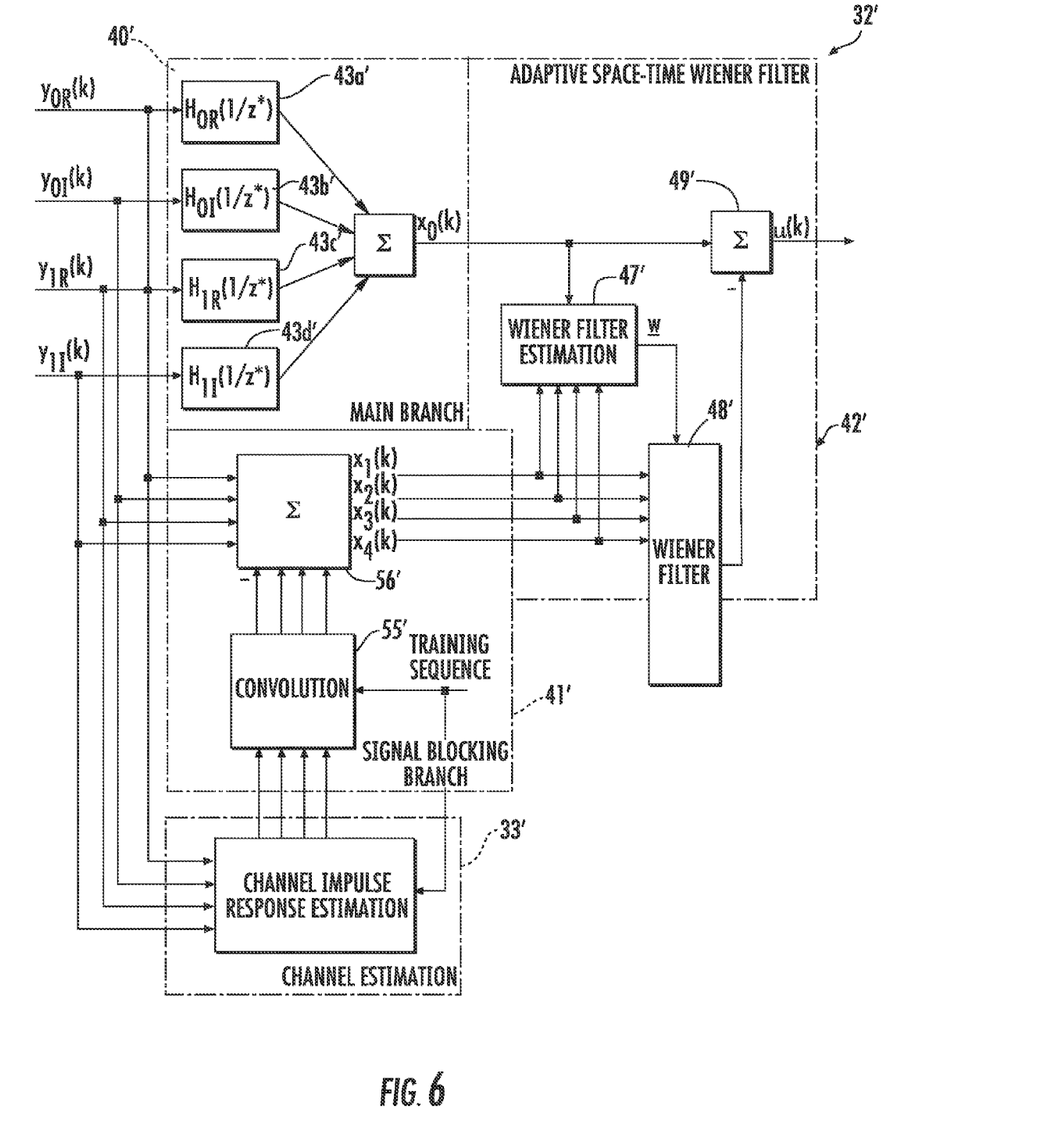
FIG. 6 is a schematic block diagram of an alternative embodiment of the ICMF and channel estimator of FIG. 2.
Figure 7:
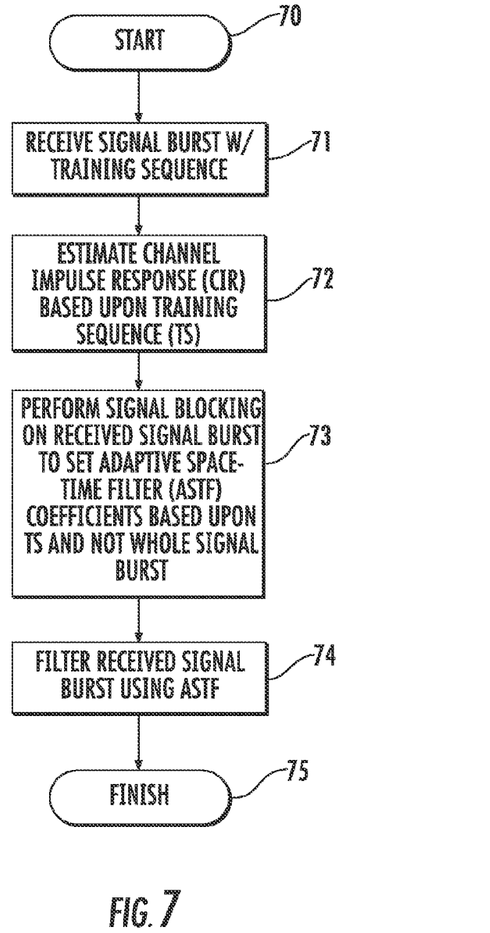
FIGS. 7 and 8 are flow diagrams of ICMF methods using the ICMF and channel estimator of FIG. 5.
Figure 8:
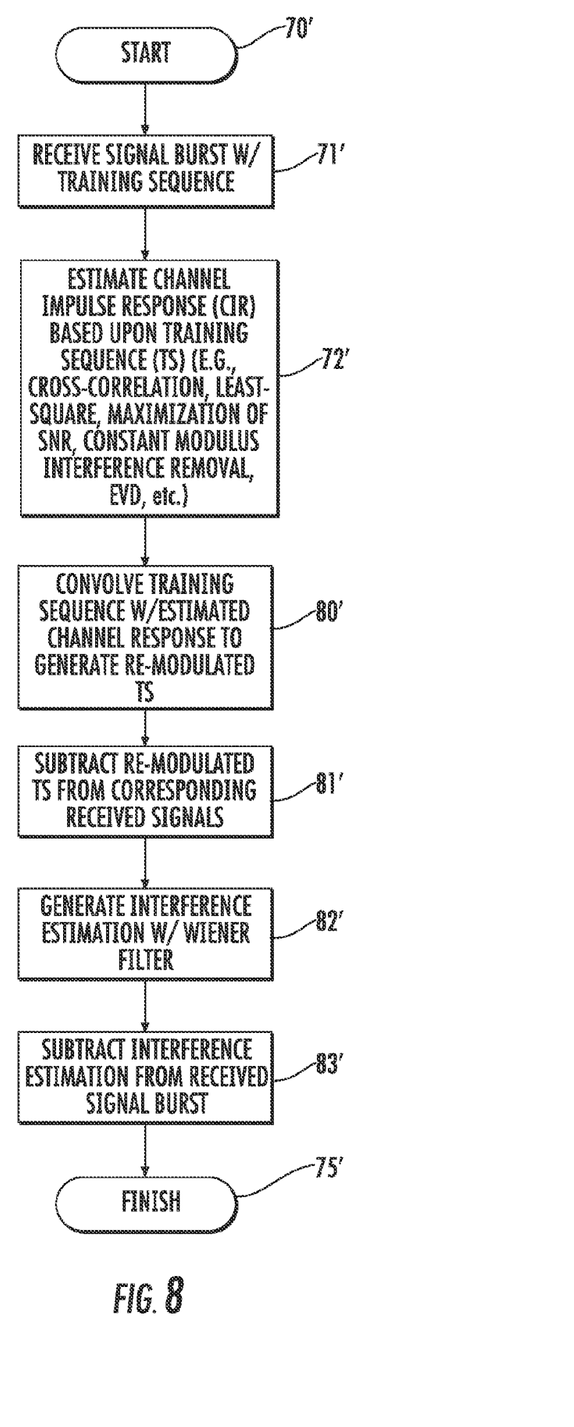

An alternative embodiment of the ICMF receiver 32' and corresponding method steps are now described with reference to FIGS. 6 through 8. Beginning at Block 70, as discussed above an antenna array (i.e., real or virtual) receives the signal burst (e.g., from a base station in a cellular network) which includes a training sequence therein, at Block 71. Again, an adaptive space-time (e.g., Wiener) filter 42' is connected to the virtual antenna array and has settable filter coefficients w. The ICMF 30' further illustratively includes a CIR estimator 33', which may estimate the CIR based upon cross-correlation, least square, maximization of SNR, constant modulus interference removal, EVD, or other techniques, as discussed further above, based upon the training sequence (Blocks 72, 72').

In the present embodiment, the signal blocker 41' is operatively connected between the CIR estimator 33' and the adaptive space-time filter 42' so that the filter coefficients thereof are set based upon the training sequence and not the whole signal burst, at Block 73. However, the Wiener filter 48' is then applied to the whole signal burst to remove the unwanted interference (Block 74), thus concluding the method illustrated in FIG. 7 (Block 75). Applicants theorize, without wishing to be bound thereto, that estimating the channel response based upon the training sequence portion of the received signal burst will provide a more accurate estimation than performing channel estimation over the entire signal burst, resulting in improved interference cancellation.

More particularly, the signal blocker 41' illustratively includes a convolver 55' that re-modulates the training sequence by convolving the training sequence with the estimated channel response (Block 80'). A summer 56' of the signal blocker 41' then subtracts the re-modulated training sequence from corresponding received signals, as shown in FIG. 6 (Block 81'). As discussed further above, the interference filtering operation includes generating an interference estimation using the Weiner filter 48', at Block 82', and then subtracting the interference estimation from the received signal burst using the summer 49', at Block 83'.

One example of a hand-held mobile wireless communications device 1000 that may be used in accordance with the system 20 is further described in the example below with reference to FIG. 9. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 9:
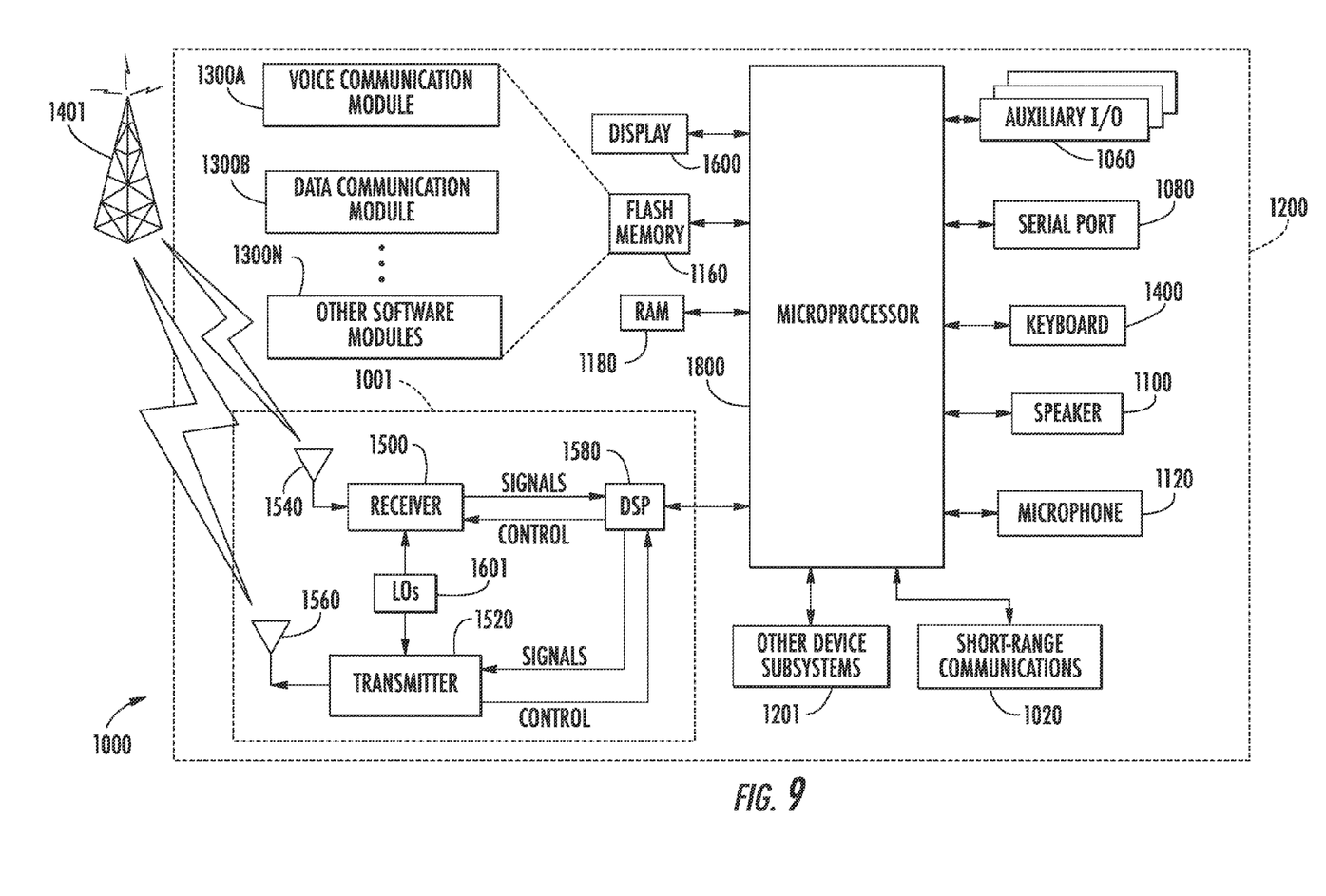
FIG. 9 is a schematic block diagram of an exemplary model wireless communication device in which the DARP-capable receiver of FIG. 1B may be used.

In addition to the processing device 1800, other parts of the mobile device 1000 are shown schematically in FIG. 9. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RP communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For, example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications device comprising:
    at least one antenna for receiving a signal burst including a training sequence;
    a derotator coupled downstream from said at least one antenna;
    an adaptive space-time filter having settable filter coefficients coupled downstream from said derotator;
    a channel impulse response estimator for estimating a channel impulse response based upon the training sequence;
    a signal blocker operatively connected between said channel impulse response estimator and said adaptive space-time filter so that the filter coefficients thereof are set based upon the training sequence; and
    an equalizer coupled downstream from said adaptive space time filter.

2. The wireless communications device according to claim 1 wherein said signal blocker subtracts a re-modulated training sequence from corresponding received signals.

3. The wireless communications device according to claim 2 wherein said signal blocker comprises a summer and a convolver connected thereto; and wherein said convolver re-modulates the training sequence by convolving the training sequence with the estimated channel response.

4. The wireless communications device according to claim 1 wherein said at least one antenna comprises a virtual antenna array.

5. The wireless communications device according to claim 1 wherein said equalizer comprises a Viterbi equalizer.

6. The wireless communications device according to claim 1 wherein said adaptive space-time filter comprises a Wiener filter for generating an interference estimation.

7. The wireless communications device according to claim 6 wherein said adaptive space-time filter further comprises a summer for subtracting the interference estimation from the received signal burst.

8. The wireless communications device according to claim 1 wherein said channel impulse response estimator estimates the channel impulse response based upon a cross-correlation of the training sequence and the received signal burst.

9. The wireless communications device according to claim 1 wherein said channel impulse response estimator estimates the channel impulse response using a least-square channel estimation based upon the training sequence.

10. The wireless communications device according to claim 1 wherein said channel impulse response estimator estimates the channel impulse response based upon a maximization of a signal-to-noise ratio of the received signals corresponding to the training sequence.

11. The wireless communications device according to claim 1 wherein said channel impulse response estimator estimates the channel response based upon constant modulus interference removal.

12. The wireless communications device according to claim 1 wherein said channel impulse response estimator estimates the channel response based upon a signal subspace finding and the use of an Eigenvector decomposition.

13. A wireless communications device comprising:
    at least one antenna for receiving a signal burst including a training sequence;
    a derotator coupled downstream from said at least one antenna;
    an adaptive space-time filter having settable filter coefficients coupled downstream from said derotator;
    a channel impulse response estimator for estimating a channel impulse response based upon the training sequence;
    a signal blocker operatively connected between said channel impulse response estimator and said adaptive space-time filter so that the filter coefficients thereof are set based upon the training sequence, said signal blocker for subtracting a re-modulated training sequence from corresponding received signals; and
    a Viterbi equalizer coupled downstream from said adaptive space time filter.

14. The wireless communications device according to claim 13 wherein said signal blocker comprises a summer and a convolver connected thereto; and wherein said convolver re-modulates the training sequence by convolving the training sequence with the estimated channel response.

15. The wireless communications device according to claim 13 wherein said at least one antenna comprises a virtual antenna array.

16. The wireless communications device according to claim 13 wherein said adaptive space-time filter comprises a Wiener filter for generating an interference estimation.

17. The wireless communications device according to claim 13 wherein said channel impulse response estimator estimates the channel response based upon constant modulus interference removal.

18. The wireless communications device according to claim 13 wherein said channel impulse response estimator estimates the channel response based upon a signal subspace finding and the use of an Eigenvector decomposition.

19. A wireless communications method using a wireless communications device including at least one antenna for receiving a signal burst including a training sequence, a derotator coupled downstream from the at least one antenna, and an adaptive space-time filter having settable filter coefficients coupled downstream from the derotator, the method comprising:
- using a channel impulse response estimator for estimating a channel impulse response based upon the training sequence; and
- using a signal blocker operatively connected between the channel impulse response estimator and the adaptive space-time filter so that the filter coefficients thereof are set based upon the training sequence.

20. The method according to claim 19 wherein using the signal blocker comprises subtracting a re-modulated training sequence from corresponding received signals.

21. The method according to claim 19 wherein the at least one antenna comprises a virtual antenna array.

22. The method according to claim 19 wherein using the channel impulse response estimator comprises estimating the channel impulse response based upon a cross-correlation of the training sequence and the received signal burst.

23. The method according to claim 19 wherein using the channel impulse response estimator comprises estimating the channel response based upon constant modulus interference removal.

24. The method according to claim 19 wherein using the channel impulse response estimator comprises estimating the channel response based upon a signal subspace finding and the use of an Eigenvector decomposition.

* * * * *